United States Patent
Campbell et al.

(10) Patent No.: US 9,828,040 B2
(45) Date of Patent: Nov. 28, 2017

(54) MULTILAYER COMPONENT ASSEMBLY FOR AUTOMOBILES

(71) Applicant: FORD GLOBAL TECHNOLOGIES, LLC, Dearborn, MI (US)

(72) Inventors: Aindrea McKelvey Campbell, Beverly Hills, MI (US); Amanda Kay Freis, Ann Arbor, MI (US); Darrin Neil Wagner, Bloomfield Hills, MI (US); Srinath Vijayakumar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 727 days.

(21) Appl. No.: 14/318,994

(22) Filed: Jun. 30, 2014

(65) Prior Publication Data

US 2015/0375792 A1     Dec. 31, 2015

(51) Int. Cl.
*B62D 27/02* (2006.01)
*F16B 5/04* (2006.01)
*F16B 19/08* (2006.01)

(52) U.S. Cl.
CPC ............. *B62D 27/02* (2013.01); *F16B 5/04* (2013.01); *F16B 19/086* (2013.01)

(58) Field of Classification Search
CPC ........ F16B 19/04; F16B 19/08; F16B 19/086; F16B 5/04; B21J 15/025; B32B 15/01; B32B 15/20; Y10T 29/49943; Y10T 29/49956
See application file for complete search history.

(56) References Cited

U.S. PATENT DOCUMENTS

| | | | |
|---|---|---|---|
| 4,512,699 A * | 4/1985 | Jackson | F16B 5/02 403/28 |
| 5,603,153 A | 2/1997 | Zmyslowski | |
| 6,769,595 B2 * | 8/2004 | Stol | B21J 15/027 228/112.1 |
| 6,835,020 B2 | 12/2004 | Wang et al. | |
| 7,284,319 B2 * | 10/2007 | Kato | B21J 15/025 29/243.53 |
| 7,628,573 B2 | 12/2009 | Philipskotter et al. | |

(Continued)

FOREIGN PATENT DOCUMENTS

| | | | | |
|---|---|---|---|---|
| CA | 2469651 A1 * | 7/2003 | | B21J 15/025 |
| DE | 349219 C * | 2/1922 | | F16B 5/04 |

(Continued)

OTHER PUBLICATIONS

Eric Oberg et al., Riveted Joints, Machinery's Handbook, (2012) p. 1733, 29th ed., Industrial Press, New York.

*Primary Examiner* — Jonathan Masinick
(74) *Attorney, Agent, or Firm* — Jason Rogers; Brooks Kushman, P.C.

(57) ABSTRACT

An automotive aluminum alloy component assembly includes a first vehicle component defining a first joint region and a first cutout. The assembly also includes a second vehicle component defining a second joint region. The assembly also includes a third vehicle component defining a third joint region. Portions of the first and third joint region sandwich the second joint region. A first self-piercing rivet is disposed within the second and third components and aligned with the first cutout.

20 Claims, 9 Drawing Sheets (56) References Cited

U.S. PATENT DOCUMENTS

| | | | | |
|---|---|---|---|---|
| 2004/0013465 A1* | 1/2004 | LaPointe | ................ | F16C 11/04 |
| | | | | 403/408.1 |
| 2004/0052581 A1* | 3/2004 | Assler | ..................... | B21J 15/02 |
| | | | | 403/408.1 |
| 2010/0232906 A1* | 9/2010 | Singh | ..................... | B21J 15/025 |
| | | | | 411/501 |
| 2011/0302755 A1* | 12/2011 | Wang | ..................... | B21J 15/025 |
| | | | | 29/402.01 |
| 2013/0094924 A1* | 4/2013 | Lee | ....................... | F16B 19/086 |
| | | | | 411/502 |
| 2015/0362004 A1* | 12/2015 | Campbell | ............. | B21J 15/025 |
| | | | | 411/502 |

FOREIGN PATENT DOCUMENTS

| | | | | | |
|---|---|---|---|---|---|
| DE | 2704492 A1 | * | 8/1978 | ................ | F16B 5/04 |
| DE | 4320068 C1 | * | 12/1994 | ............ | B21J 15/025 |
| DE | 29509439 U1 | * | 8/1995 | ............ | B23P 19/062 |
| DE | 19909821 A1 | * | 9/2000 | ............ | F16B 19/086 |
| DE | 102007003430 A1 | * | 12/2007 | ............ | B21J 15/025 |
| DE | 102008053102 A1 | * | 5/2009 | ............ | B21J 15/025 |
| DE | 102009035777 A1 | * | 2/2011 | ................ | B21J 5/06 |
| DE | 102010009026 A1 | * | 8/2011 | ............ | B21J 15/025 |
| DE | 102012005203 A1 | * | 9/2013 | ............ | B21J 15/025 |
| JP | 2007064439 A | * | 3/2007 | ............ | B21J 15/025 |
| JP | 2009142889 A | * | 7/2009 | ............ | B21J 15/025 |
| WO | WO 0248556 A1 | * | 6/2002 | .......... | B21D 39/031 |
| WO | WO 2007058191 A1 | * | 5/2007 | ................ | F16B 5/04 |
| WO | WO 2013150022 A1 | * | 10/2013 | ................ | F16B 5/04 |

\* cited by examiner

MULTILAYER COMPONENT ASSEMBLY FOR AUTOMOBILES

TECHNICAL FIELD

The present disclosure relates to automotive vehicle body assemblies that include self-piercing rivets.

BACKGROUND

Pickup trucks are motor vehicles with a rear open top cargo area that is often referred to as a cargo box. Pickup trucks are popular largely because the bed allows the vehicle to be utilized in many different ways, including carrying a variety of types of cargo and towing various types of trailers. Traditionally, the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient while maintaining or improving functionality and durability. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than elastic modulus of steel. Additionally, fabrication techniques and methods for joining parts that work well for steel parts may not work well for the same aluminum part. Due to these and other differences, simple material substitution does not necessarily produce acceptable design.

Aluminum alloys are generally identified by a four digit number, the first digit of which typically identifies the major alloying element. When describing a series of aluminum alloys based on the majority alloying element, the first number may be followed by three x's or three zeros. For example, the major alloying element in 6xxx (or 6000) series aluminum alloy is magnesium and silicon, while the major alloying element of 5xxx series is magnesium and for 7xxx series is zinc. Additional numbers represented by the letter 'x' (or zero) in the series designation define the exact aluminum alloy.

SUMMARY

In one embodiment, an automotive aluminum alloy component assembly includes a first vehicle component defining a first joint region and a first cutout. The assembly also includes a second vehicle component defining a second joint region. The assembly also includes a third vehicle component defining a third joint region. Portions of the first and third joint region sandwich the second joint region. A first self-piercing rivet is disposed within the second and third components and aligned with the first cutout.

In another embodiment, a multiple aluminum component assembly for an automobile includes a first self-piercing rivet disposed within the first and second vehicle components. The assembly also includes a second self-piercing rivet disposed within the second vehicle component and a third vehicle component. The first and second self-piercing rivets cooperate to form a joint between the first second and third components.

In yet another embodiment, an automotive aluminum alloy component assembly includes first second and third vehicle components. Each of the vehicle components include an edge portions that define a flange. A first cutout is defined in the edge portion of the first component. A first tab is defined in the edge portion of the second component is aligned with the cutout. A first self-piercing rivet is aligned with the cutout and is disposed within the third component and the tab.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

In order to increase fuel efficiency, automobiles may include aluminum alloy components. Traditional joining techniques, such as spot welding, may not work well with aluminum alloy components. Aluminum alloy components may be joined with self-piercing rivets. Self-piercing rivets are an advantageous joining technique because of high production volume capacity and compatibility with adhesives. While self-piercing rivets are a suitable joining technique for aluminum alloy components, they do have their challenges. For example, the inner most component layer of the joint must have sufficient thickness to enable mechanical interlock between the rivet and the bottom layer while simultaneously avoiding rivet breakthrough.

Figure 1:
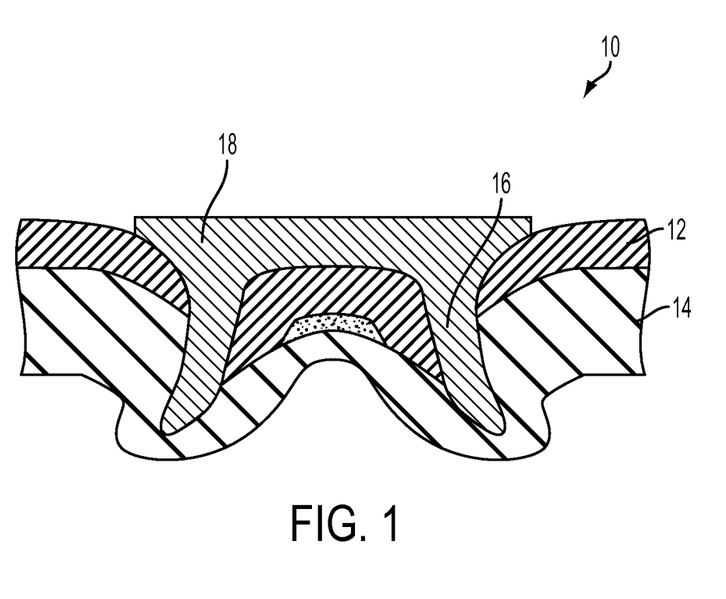
FIG. 1 is a side cross-sectional view of a self-piercing rivet joining two component layers.

Self-piercing rivets are particularly suited for joining assemblies having only two component layers. Referring to FIG. 1, a self-piercing rivet joint 10 having first and second component layers 12, 14 is shown. To create a sufficiently strong joint, the shank 16 of the self-piercing rivet 18 must at least partially penetrate into all of the component layers and the legs 16 must sufficiently splay in order to create acceptable interlock.

While more difficult, self-piercing rivets may be used to join assemblies having three or more component layers. The shank of the self-piercing rivet may be increased in order to penetrate through the additional component layers. The thickness and the strength of the shank may also be increased to achieve sufficient penetration of the shank into the joint. The feasibility of using self-piercing rivets through three component layers is partially dependent upon the thickness of the inner most layer and the required strength of the joint. If the innermost layer thickness is 50% or more of the total joint thickness, then joining three component layers is more easily achieved. However, if the innermost layer thickness is thinner then problems may occur. One problem associated with the increased shank length is breakthrough. Breakthrough is when the bottom layer becomes too thin during joining and tears, thus exposing inner layers and sometimes the shank of the rivet. Breakthrough reduces the strength of the joint and increase risk of corrosion. Breakthrough is particularly problematic if adhesive is applied between the component layers. The adhesive may leak out through the tear and contaminate the die. If the die becomes contaminated, the manufacturing line must be shut down in order to clean the adhesive off of the die. This causes reduced productivity and increases costs.

Figure 2A:
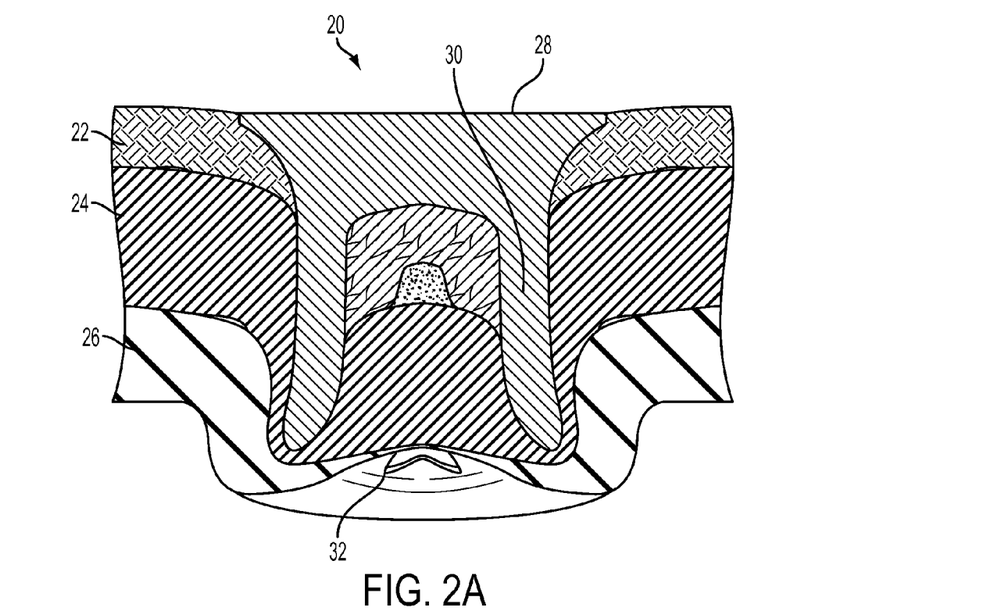
FIG. 2A is a side cross-sectional view of a self-piercing rivet joining three component layers and illustrating one potential problem with three component layer joints.
Figure 2B:
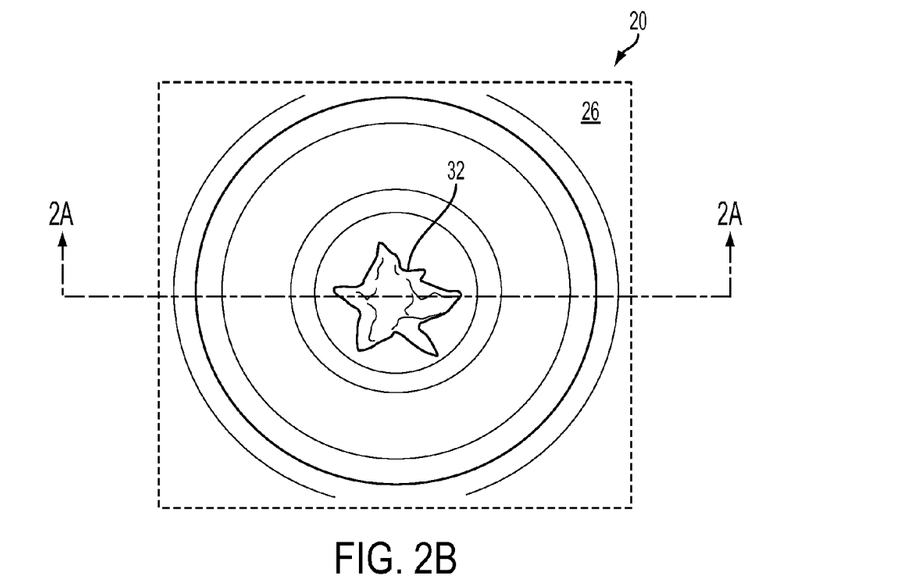
FIG. 2B is a bottom view of the self-piercing rivet from FIG. 2A illustrating breakthrough.

FIGS. 2A and 2B illustrate a three component layer joint with breakthrough. The joint 20 includes first, second and third component layers 22, 24 and 26 that are secured together with self-piercing rivet 28. The thickness of third component layer 26 is less than 50% of the total joint thickness. The shank 30 of the self-piercing rivet 28 is extended in order to penetrate through the three component layers. However, because the innermost material layer 26 was relatively thin, component layer 26 was stretched too thin creating a tear 32.

Figure 3:
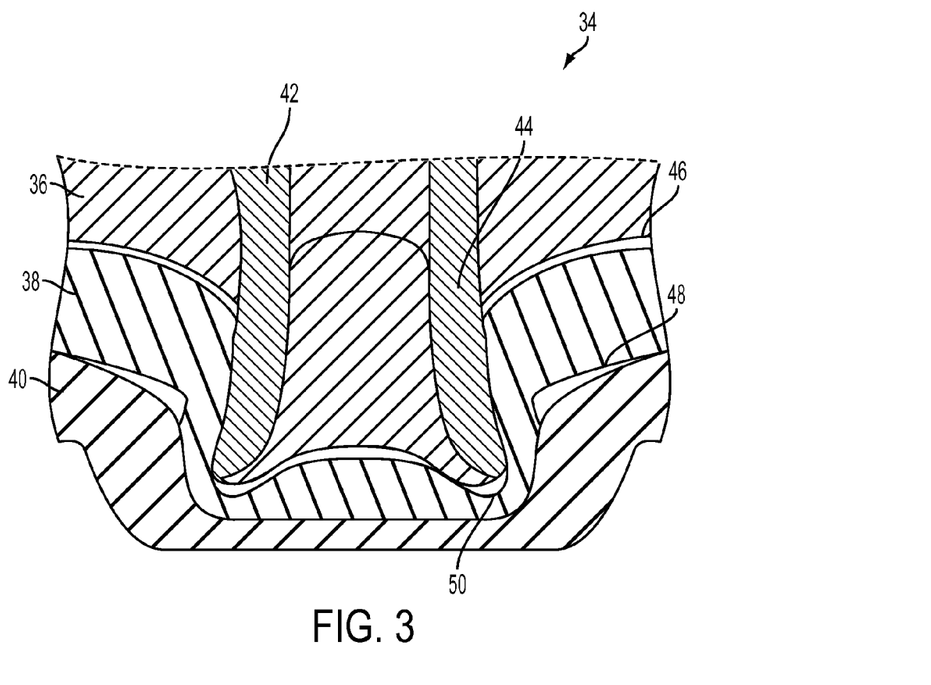
FIG. 3 is a side cross-sectional view of a self-piercing rivet joining three component layers and illustrating another potential problem with three component layer joints.

The likelihood of breakthrough can be reduced by shortening the shank. However shortening the shank may cause other problems such as reduced penetration and interlock. This weakens the joint. In some applications less joint strength is required and reduced interlock is less of an issue. Referring to FIG. 3, a self-piercing rivet joint 34 having first, second and third component layers 36, 38 and 40 is shown. The joint 34 includes a self-piercing rivet 42 for securing the component layers together. The self-piercing rivet 42 includes a shank 44. Joint 34 is a failed joint because the self-piercing rivet 42 failed to penetrate through all of the material layers 36, 38 and 40 and failed to achieve interlock. Because of the failed penetration and interlock the joint has separated at areas 46, 48 and 50.

Automobiles may include joints that require three or more aluminum alloy component layers to be secured to each other. In some applications, it is ideal to secure the component layers with self-piercing rivets.

Figure 4:
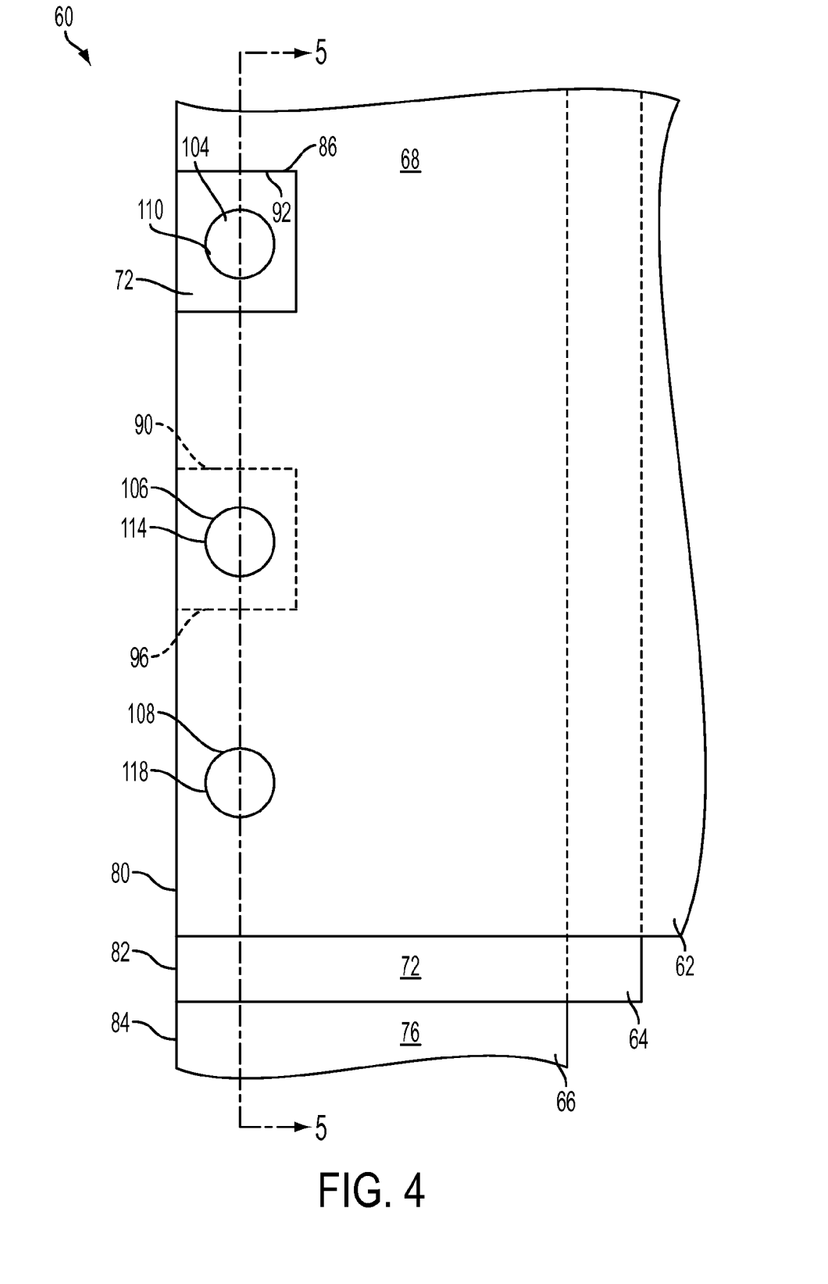
FIG. 4 is a plan view of a vehicle body assembly according to one embodiment of this disclosure.
Figure 5:
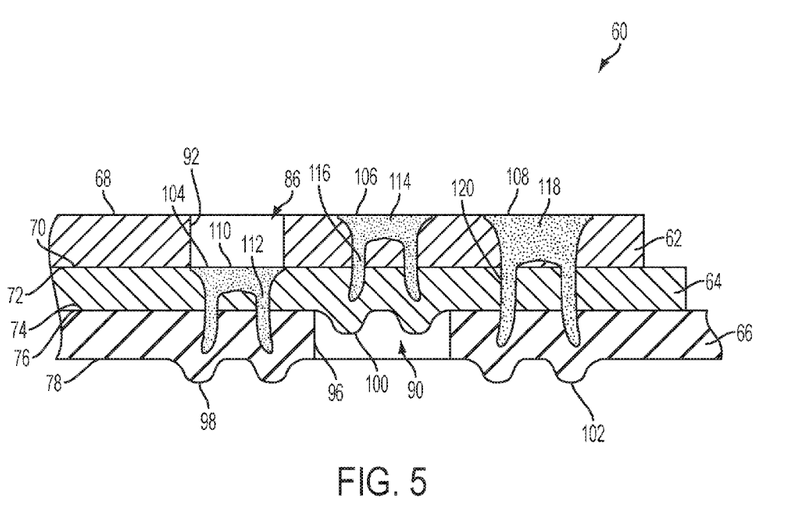
FIG. 5 is a side cross-sectional view of the assembly from FIG. 4 along cut line 5-5.

Referring to FIGS. 4 and 5, a three component layer assembly 60 is joined with self-piercing rivets and avoids the breakthrough and interlock problems described above. The assembly 60 utilizes selectively placed cutouts to reduce the number of component layers any one self-piercing rivet must secure. The assembly 60 includes a first component layer 62, a second component layer 64, and a third component layer 66. The first and third component layers 62, 66 are the outer most layers and sandwich the second or middle component layer 64. Each of the first, second and third components include an assembly region defining where the components are stacked against each other.

The first component layer 62 includes a top surface 68 that defines the top of the assembly 60. The first component layer 62 also includes an inner surface 70 that is disposed against the middle component layer 64. The top surface 68 and the inner surface 70 define a thickness of the first component layer 62. The middle component layer 64 includes a first surface 72 disposed against the inner surface 70 and a second surface 74 that is disposed against the third component layer 66. The first surface 72 and the second surface 74 define a thickness of the middle component layer 64. The third component layer 66 includes an inner surface 76 that is disposed against the second surface 74 and a bottom surface 78 that defines the bottom of the assembly 60. The inner surface 76 and the bottom surface 78 define a thickness of the third component layer 66.

The first component layer 62 includes at least one cutout 86 located within the assembly region. The first component layer 62 includes at least one cutout inner wall 92 that defines the periphery of the cutout 86. The at least one inner wall 92 extends between the top surface 68 and the inner surface 70 defining a cutout completely through the first component 62. The cutout 86 locally transforms the three component layer assembly into a local two component layer assembly. At least one self-piercing rivet 104 may be installed into the assembly 60 at the at least one cutout 86.

The self-piercing rivet 104 includes a head 110 and a shank 112 that extends perpendicularly from the head 110. The self-piercing rivet 104 is installed by aligning the self-piercing rivet 104 within the cutout 86 with the shank 112 against the first surface 72 of the middle layer 64. At least a portion of a driving head of a rivet driving tool is also received within the cutout 86 and engages with the head 110. A bottom die of the rivet driving tool is disposed against the portion of the bottom surface 78 that is aligned with the driving head. The rivet driving head includes a punch that engages with the head 110 of the rivet and drives the self-piercing rivet 104 into the middle component layer 64 and the third component layer 66. The head 110 of the rivet may be substantially flush with the first surface 72. The riveting process deforms the third component layer 66 forming a button 102 that is substantially aligned within the cutout 86. The cut-out 86 portion allows for the self-piercing rivet to be disposed within only the middle component layer 64 and the third component layer 66. Thus, providing a two component layer rivet in a three component layer assembly. A plurality of other self-piercing rivets may be installed within the middle and third layers 64, 66 at locations aligned with additional cutouts defined in the first component layer 62. Forming a set of first self-piercing rivets and cutouts.

The third component layer 66 includes at least one cutout 90 located within the assembly region. The third component layer 66 includes at least one cut-out inner wall 96 that defines the periphery of the cutout 90. The at least one inner wall 96 extends between the inner surface 76 and the bottom surface 78 defining a cut-out completely through the third component 66. The cutout 90 locally transforms the three component layer assembly into a local two component layer assembly.

The self-piercing rivet 106 includes a head 114 and a shank 116 that extends perpendicularly from the head 114. The self-piercing rivet 106 is installed by placing the shank 116 against the top surface 68 of the first component layer 62 at a location aligned within a periphery of the cutout 90. The driving head of the riveting tool is engaged with the head 114 and the bottom die of the riveting tool is placed against the second surface 74 of the second component layer 64 within the cutout 90. The punch drives the self-piercing rivet 106 into the first layer 62 and the middle layer 64. A button 100 is formed into the second surface 74 during riveting and is disposed within the cutout 90. Thus, providing another two component layer rivet in a three component layer assembly. A plurality of other self-piercing rivets may be installed within the first and middle layers 62, 64 at locations aligned with additional cutouts defined in the third component layer 66. Forming a set of second self-piercing rivets and cutouts. The first set of self-piercing rivets and cutouts, and the second set of self-piercing rivets and cutouts can be alternated along the assembly region to create a three component layer assembly joined with a plurality of bilayer self-piercing-rivets.

The assembly 60 may also include a third self-piercing rivet 108 that is disposed within the first, second and third component layers 62, 64, 66. The third self-piercing rivet 108 includes a head 118 and a shank 120 that extends perpendicularly from the head. When installed, the head at 118 may be substantially flush with the top surface 68. The self-piercing rivet 108 may be longer and more robust than rivets 104 and 106 in order to penetrate and join three component layers. The third self-piercing rivet 108 may be installed similar to the installation of self-piercing rivets 104 and 106. The feasibility of a tri-layer self-piercing rivet depends upon the required strength of the joint and the thickness of the bottom component layer. Tri-layer self-piercing rivets may be incorporated with the first and second sets of bilayer self-piercing rivets. The tri-layer self-piercing rivets may be installed in locations that require a less secure connection. Using tri-layer rivets as part of the fastening scheme can reduce the number of cutouts required in the assembly 60. The rivets may be aligned along a rivet line as is shown in FIG. 4 or may be staggered. The rivets may also be aligned along an edge 80 of the assembly or may be located at a more central location of the assembly 60.

The buttons 98 and 102 project outwardly from the bottom surface 78 and may cause fit and finish problems if the surface 78 is to be installed against another surface. A part that is designed to be disposed against the bottom surface 78 may include an engaging surface having cavities for receiving the buttons 98 and 102. The cavities create a clearance for the buttons and allow for the part to only engage with the bottom surface 78 along the smooth portions of the bottom surface 78.

Figure 6:
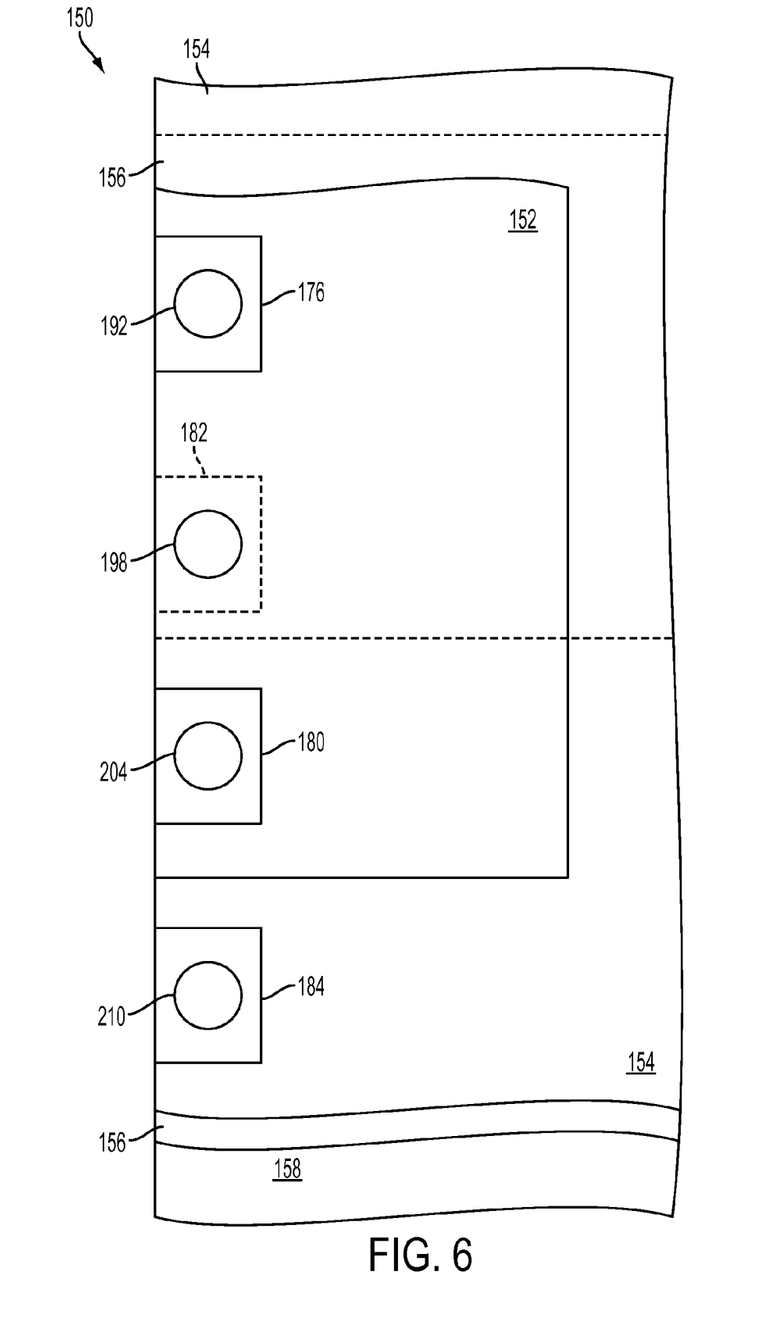
FIG. 6 is a plan view of a vehicle body assembly according to another embodiment of this disclosure.
Figure 7:
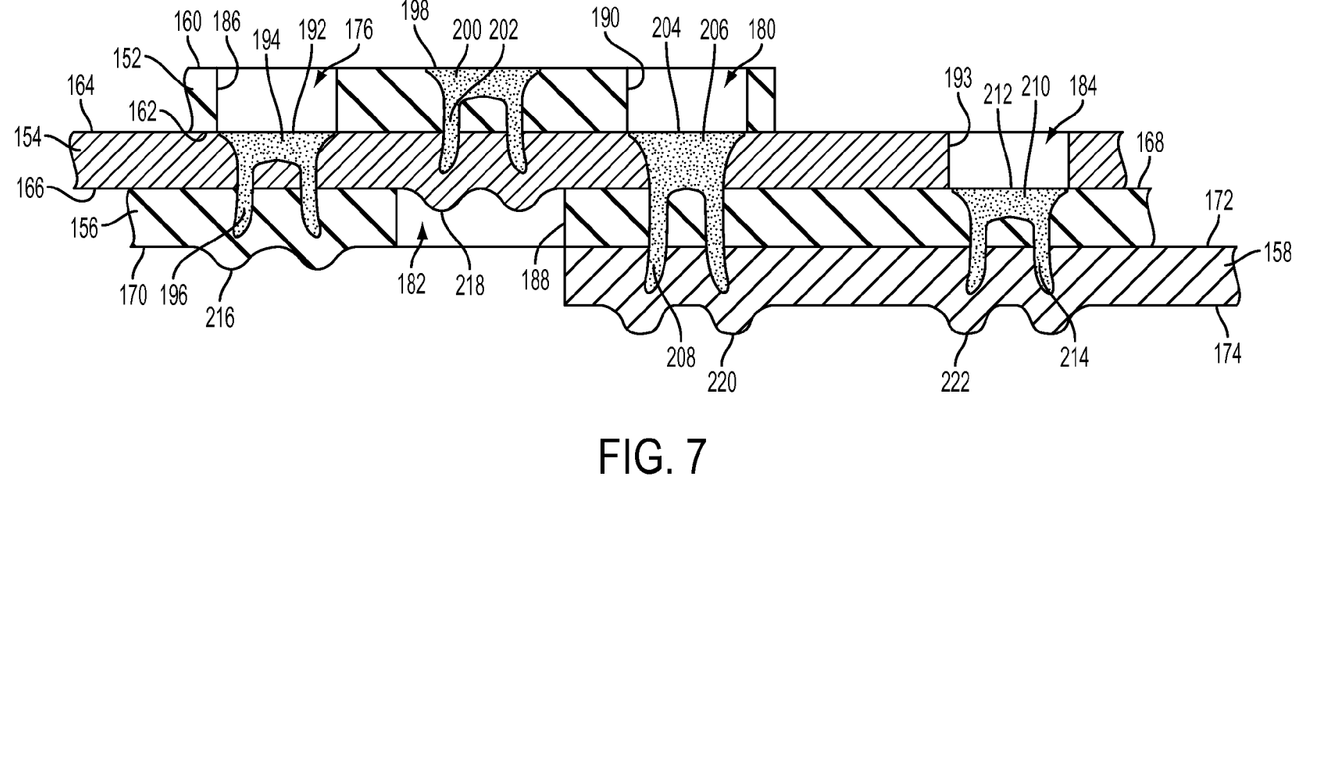
FIG. 7 is a side cross-sectional view of the assembly from FIG. 6 along cut line 7-7.

Referring to FIGS. 6 and 7 a four component layer assembly 150 is secured with self-piercing rivets. The assembly 150 utilizes selectively placed cutouts to reduce the number of component layers any one self-piercing rivet must secure. The assembly 150 includes a first component layer 152, a second component layer 154, a third component layer 156, and a fourth component layer 158. Each of the first, second, third and fourth component layers include an assembly region where the components are stacked against each other. Some portions of the assembly region include a stack of all four layers and other regions of the assembly may include only two or three of the four layers.

The first component layer 152 includes a first surface 160 and an opposing second surface 162 that is disposed against the second component layer 154. The first and second surfaces 160, 162 define a thickness of the first component layer 152. The second component layer 154 includes a first surface 164 that is disposed against the second surface 162 and a second surface 166 that is disposed against the third component layer 156. The third component layer 156 includes a first layer 168 that is disposed against the second layer 166 and a second layer 170 that is disposed against the fourth component 158. The fourth component 158 includes a first surface 172 that is disposed against the second surface 170 and a second surface 174 opposite the first surface 172.

The first component layer 152 includes at least one first cutout 176 located within the assembly region of the first component layer 152. The first component layer 152 includes at least one cutout inner wall 186 that defines the periphery of the cutout 176. The at least one inner wall 186 extends between the first surface 160 and the second surface 162 defining a cutout completely through the first component 152. The cutout 176 locally transforms the three component layer assembly into a local two layer component assembly. A self-piercing rivet 192 is installed into the assembly 150 at the at first cutout 176.

The self-piercing rivet 192 includes a head 194 and a shank 196 that extends perpendicularly from the head 194. The self-piercing rivet 192 is installed by aligning the self-piercing rivet 192 within the cutout portion 176 with the shank 196 against the first surface 164 of the second layer 154. The punch engages with the head 194 in drives the rivet 192 into the second component layer 154 and the third component layer 156. The riveting process forms a button 216 in the second surface 170 of the third component 156. The head 194 may be substantially flush with the first surface 164 when the rivet 192 is fully installed. A plurality of other self-piercing rivets may be installed within the second and third layers 154, 156 at locations aligned with additional cutouts defined in the first component layer 152.

The third component layer 156 includes at least one cutout 182 located within the assembly region. The third component layer 156 includes at least one cutout inner wall 188 that defines the periphery of the cutout 182. The at least one inner wall 188 extends between the first surface 168 and the second surface 170 defining a cutout completely through the third component 156.

A self-piercing rivet 198 includes a head 200 and a shank 202 that extends perpendicularly from the head 200. The self-piercing rivet 198 is installed by placing the shank 202 against the first surface 160 of the first component layer 152 at a location aligned within a periphery of the cutout 182. The punch of the riveting machine engages with the head 200 and the bottom die is placed against the second surface 166 of the second component 154 within the cutout 182. The punch drives the self-piercing rivet 198 into the first layer 152 and the second layer 154. A button 218 is formed into the second surface 166 and is disposed within the cutout 182. A plurality of other self-piercing rivets may be installed within the first and second layers 152, 154 at locations aligned with additional cutouts defined in the third component layer 156.

The first component layer 152 includes a second cutout 180 located within the assembly region of the first component layer 152. The first component layer 152 includes a cutout inner wall 190 that defines the periphery of the cutout 180. The at least one inner wall 190 extends between the first surface 160 and the second surface 162 defining a cutout completely through the first component 152. A self-piercing rivet 204 is installed into the assembly 150 at the cutout 180.

The self-piercing rivet 204 includes a head 206 and a shank 208 that extends perpendicularly from the head 206. The self-piercing rivet 204 is installed by aligning the self-piercing rivet 204 within the cutout portion 180 with the shank 208 against the first surface 164 of the second layer 154. The punch engages with the head 206 and drives the rivet 204 into the second component layer 154, the third component layer 156 and the fourth component layer 158. The riveting process forms a button 220 in the second surface 174 of the fourth component 158. The head 206 may be substantially flush with the first surface 164 of the second component 154 when the rivet 204 is fully installed. A plurality of other self-piercing rivets may be installed within the second, third and fourth layers 154, 156, 158 at locations aligned with additional cutouts defined in the first component layer 152.

The second component layer 154 includes at least one cutout 184 located within the assembly region of the second component. The second component layer 154 includes at least one cutout inner wall 192 that defines the periphery of the cutout 184. The at least one inner wall 192 extends between the first surface 164 and the second surface 166 defining a cutout completely through the second component 154. A self-piercing rivet 210 is installed into the assembly 150 at the cutout 184.

The self-piercing rivet 210 includes a head 212 and a shank 214 that extends perpendicularly from the head 212. The self-piercing rivet 210 is installed by placing the shank 212 against the first surface 168 of the third component 156 at a location aligned within a periphery of the cutout 184. The driving punch is engaged with the head 212 and drives the rivet 210 into the third component layer 156 and the fourth component layer 158. The riveting process forms of button 222 in the second surface 174 of the fourth component 158. The head 212 may be substantially flush with the first surface 168 when the rivet 210 is fully installed. A plurality of other self-piercing rivets may be installed within the third and fourth component layers 156, 158 at locations aligned with additional cutouts defined into the second component layer 154.

Figure 8:
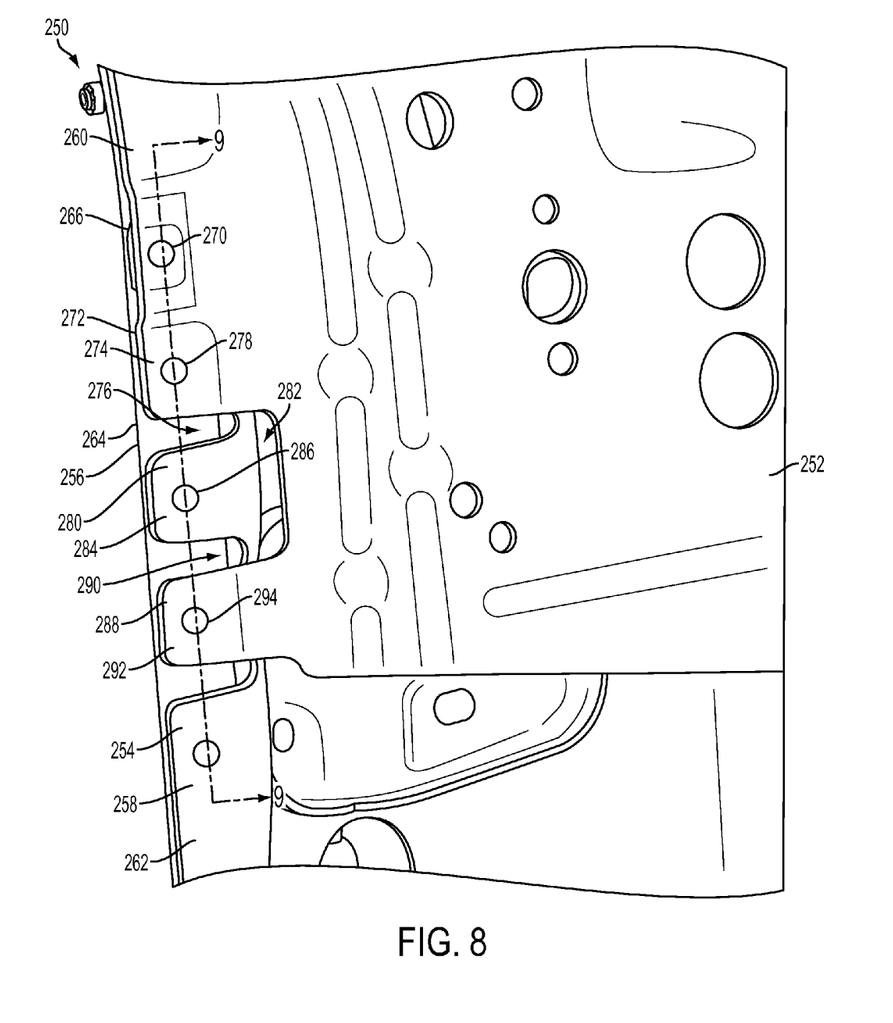
FIG. 8 is a fragmented perspective view of a vehicle body assembly according to yet another embodiment of this disclosure.
Figure 9:
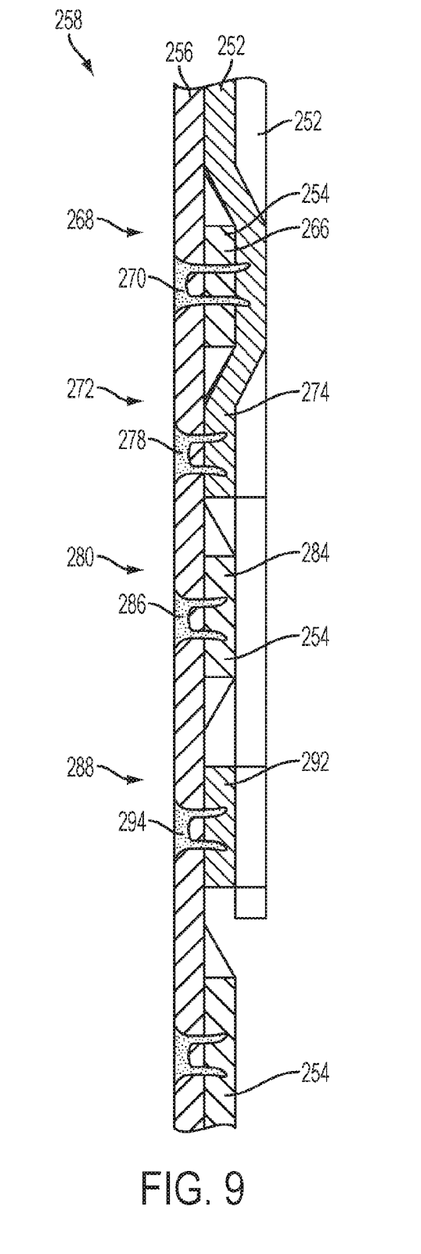
FIG. 9 is a cross-sectional view of the assembly from FIG. 8 along cut line 9-9.

Referring to FIGS. 8 and 9 a vehicle body assembly 250 includes an A-pillar 252, a hinge pillar 254 and a body panel 256 that are stacked against each other. The A-pillar 252 defines an inside surface of the assembly and the body panel 256 defines an outside surface of the assembly. The hinge pillar 254 is disposed between the A-pillar 252 and the door panel 256.

The A-pillar 252 includes and edge portion 260, the hinge pillar 254 includes an edge portion 262 and the door panel 256 includes an edge portion 264. The edge portions are stacked against each other and define a flange 258. The A-pillar 252, the hinge pillar 254 and the door panel 256 are joined together at the flange 258. A plurality of rivets are disposed in the flange for joining the assembly 250 together. The rivets may be self-piercing rivets. The rivets may be disposed along a rivet line or may be staggered.

The edge portions of the A-pillar 252 and the hinge pillar 254 may include a plurality of cutouts and tabs that cooperate to provide a flange 258 having two layer portions and three layer portions. The two layer portions reduces the number of component layers that some self-piercing rivet must join.

In the illustrated embodiment, the edge portion 262 of the hinge pillar 254 includes a first tab 266. The first tab 266 is sandwiched between the edge portion 260 of the A-pillar 252 and the edge portion 264 of the door panel 256 defining a three component layer flange region 268. A self-piercing rivet 270 is disposed in all three layers to join the components together.

The flange 258 includes a two component layer region 272 where the A-pillar 252 and the door panel 258 are joined. The A-pillar 252 includes a recessed portion 274 at region 272. The hinge pillar 254 includes a cutout 276 at region 272. The recessed portion 274 is received within the cutout 276 and is disposed against the door panel 256. A self-piercing rivet 278 is disposed within the A-pillar 252 and the door panel 258.

The flange 258 also includes another two component layer region 280 where the hinge pillar 254 and the door panel 256 are joined. The A-pillar 152 includes a cutout 182 that is aligned with region 280. The cutout 282 reduces the flange thickness from three layers to two layers. The hinge pillar 254 includes a second tab 284 that is aligned with the cut-out 282 and disposed against the door panel 256. A self-piercing rivet 286 is disposed with the second tab 284 of the hinge pillar 254 and the door panel 256.

The flange 258 also includes another two component layer region 288 where the A-pillar 252 and the door panel 256 are joined. The hinge pillar 254 includes a cutout 290 that is aligned with region 288. The cutout 290 reduces the flange thickness from three layers to two layers. The A-pillar 252 includes a tab 292 that is received within the cutout 290 and is disposed against the door panel 256. A self-piercing rivet 294 is disposed within the tab 292 of the A-pillar 252 and the door panel 256.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An automotive component assembly comprising:
   a first vehicle component defining preformed cutout;
   second and third vehicle components defining second and third joint regions, wherein the first and third components sandwich the second component; and
   a self-piercing rivet (SPR) embedded within the second and third joint regions at a location aligned with the cutout, the SPR being recessed into the cutout with a top surface of the SPR below a midpoint of the first component.

2. The assembly of claim 1 wherein the SPR is not in contact with first vehicle component.

3. The assembly of claim 1 wherein the top surface of the SPR is substantially flush with a top surface of the second component.

4. The assembly of claim 1 wherein the cutout is a first cutout and the third vehicle component defines a second cutout, and further comprising a second SPR is embedded within the first and second components at a location aligned with the second cutout.

5. The assembly of claim 4 wherein the second component further includes a button formed by the second SPR and wherein the button is disposed within the second cutout.

6. The assembly of claim 4 wherein each of the SPR and the second SPRs includes a head, and the heads of each SPR are facing in a same direction.

7. The assembly of claim 1 further comprising a second SPR disposed within the first, second and third aluminum alloy vehicle components.

8. The assembly of claim 1 wherein the SPR is not in contact with the first layer.

9. The assembly of claim 1 wherein the SPR includes legs, and the legs are not disposed in the first layer.

10. A multiple aluminum component assembly for an automobile comprising:
    a stack of first, second, and third components;
    a first self-piercing rivet (SPR) embedded within the first and second components and not in the third component; and
    a second SPR embedded within the second and third components and not in the first component, wherein the first and second SPRs cooperate to form a joint between the first, second and third components.

11. The assembly of claim 10 wherein the first vehicle component defines a first preformed cutout and the second SPR is aligned within a periphery of the first cut-out.

12. The assembly of claim 11 wherein the third vehicle component defines a second preformed cutout and the first SPR is aligned within a periphery of the first cutout.

13. The assembly of claim 12 wherein the first and second cutouts are offset from each other.

14. The assembly of claim 12 wherein second SPR is recessed into the first cutout with a top surface of the second SPR being closer to the second component than the first component.

15. The assembly of claim 14 wherein second component includes a button formed by the first SPR, and wherein the button is disposed within the second cutout.

16. The assembly of claim 10 further comprising:
a fourth component; and
a third SPR disposed within the second component, the third component and the fourth component, wherein the first, second and third SPRs cooperating to form a joint between the first, second, third and fourth components.

17. The assembly of claim 10 wherein the second SPR defines a head having a top surface, and the top surface is substantially flush with a top surface of the second component.

18. The assembly of claim 10 wherein the first SPR is only disposed in the first and second components.

19. The assembly of claim 18 wherein the second SPR is only disposed in the second and third components.

20. The assembly of claim 10 wherein the first, second, and third components are formed of aluminum alloy.

* * * * *